(12) United States Patent
Demessine

(10) Patent No.: US 11,356,830 B2
(45) Date of Patent: Jun. 7, 2022

(54) METHOD FOR MONITORING THE RELATIVE POSITIONING OF TWO OBJECTS AND CORRESPONDING SYSTEM

(71) Applicant: STMicroelectronics (Rousset) SAS, Rousset (FR)

(72) Inventor: Jean-Louis Demessine, Saint-Jeannet (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/098,960

(22) Filed: Nov. 16, 2020

(65) Prior Publication Data

US 2021/0160672 A1    May 27, 2021

(30) Foreign Application Priority Data

Nov. 21, 2019   (FR) ...................................... 1913012

(51) Int. Cl.
*H04W 4/80* (2018.01)
*H04B 1/59* (2006.01)

(52) U.S. Cl.
CPC ................ *H04W 4/80* (2018.02); *H04B 1/59* (2013.01)

(58) Field of Classification Search
CPC .. H04B 5/0031; H04B 5/0056; H04B 5/0062; H04B 5/0037; H04B 5/0081; H04B 5/0068; H04B 5/0075; H04B 5/0025; H04B 5/00; H04B 5/0087; H04B 5/02; H04B 5/0043; H04B 5/0093; H04B 17/21; H04B 5/0012; H04B 7/0602; H04B 13/005; H04B 17/12; H04B 17/18; H04B 1/3816; G06K 19/0723; G06K 7/0008; G06K 7/10128; G06K 7/10237; G06K 19/07749; G06K 19/07336; G06K 19/07345; G06K 7/10297; G06K 19/0701; G06K 7/10009; G06K 19/0726; G06K 7/0095; G06K 7/10148;
(Continued)

(56) References Cited

U.S. PATENT DOCUMENTS

2007/0075411 A1* 4/2007 Tanigawa ............... G06K 19/07
                                                      257/679
2010/0019882 A1* 1/2010 Stern .................... G06K 7/0008
                                                      340/10.1
(Continued)

FOREIGN PATENT DOCUMENTS

EP      2810449         8/2013
WO   2013116414 A1      8/2013

OTHER PUBLICATIONS

INPI Search Report and Written Opinion for FR 1913012 dated Apr. 23, 2020 (10 pages).

*Primary Examiner* — Golam Sorowar
(74) *Attorney, Agent, or Firm* — Crowe & Dunlevy

(57) ABSTRACT

A first object and a second object are movable in relation to one another. The first object includes a transponder using an integrated circuit having two terminals which may or may not be shorted. The presence or absence of a short circuit between the two terminals is detected. This is accomplished at least partly by the second object depending on the relative positioning of the first and second objects. The transponder transmits, to a module having a contactless reader function, positioning information corresponding to said relative positioning using a contactless communication protocol.

45 Claims, 11 Drawing Sheets

(58) Field of Classification Search
CPC ............. G06K 7/10366; G06K 19/025; G06K 19/0707; G06K 19/0722; G06K 19/073; G06K 19/07309; H04W 4/80; H04W 88/06; H04W 12/06; H04W 12/069; H04W 12/08; H04W 76/14; H04W 52/00; H04W 52/0235; H04W 52/0241; H04W 56/0015; H04M 2250/04; H04M 1/67; H04M 1/72412; H04M 1/0262; H04M 1/21; H04M 1/23; H01Q 1/2225; H01Q 7/00; H01Q 7/005; H01Q 1/002; H01Q 1/2216; H01Q 1/2275; H01Q 1/2283; H01Q 1/273; H01Q 1/50; H01Q 5/50; H01Q 9/0442; H01Q 9/045; H01Q 9/0478

See application file for complete search history.

(56) References Cited

U.S. PATENT DOCUMENTS

| | | | |
|---|---|---|---|
| 2012/0126949 A1* | 5/2012 | Downie | G06K 19/07749 340/10.1 |
| 2014/0091918 A1 | 4/2014 | Pfeffer et al. | |
| 2019/0066232 A1* | 2/2019 | Blair, II | G06K 19/0723 |
| 2019/0294946 A1 | 9/2019 | Atkinson | |

* cited by examiner

METHOD FOR MONITORING THE RELATIVE POSITIONING OF TWO OBJECTS AND CORRESPONDING SYSTEM

PRIORITY CLAIM

This application claims the priority benefit of French Application for Patent No. 1913012, filed on Nov. 21, 2019, the content of which is hereby incorporated by reference in its entirety to the maximum extent allowable by law.

TECHNICAL FIELD

Implementations and embodiments relate to contactless transponders and, in particular, to NFC (near-field communication) transponders, for example, tags and, in particular, to the use of such transponders for detecting the relative positioning of two objects that are movable in relation to one another and one of which is fitted with a transponder.

BACKGROUND

Near-field communication, better known to those skilled in the art under the acronym NFC, is a wireless connectivity technology that allows communication over a short distance, for example 10 cm, between electronic devices, such as, for example, contactless chip cards or tags, and readers.

NFC technology is particularly suitable for connecting any type of user device and allows fast and easy communication.

A contactless transponder is a transponder that is capable of exchanging information via an antenna with a contactless reader, in accordance with a contactless communication protocol.

An NFC transponder, which is a contactless transponder, is a transponder that is compatible with NFC technology.

NFC technology is an open technological platform that has been standardized in the ISO/IEC 18092 and ISO/IEC 21481 standards, but incorporates numerous standards that already exist, such as for example the Type A and Type B protocols defined in the ISO-14443 standard, which may be communication protocols able to be used in NFC technology.

Contactless technology may also be used in RFID (Radiofrequency Identification) transponders that are compatible with the ISO 15693 and ISO 18000-3 standards.

During a transmission of information between a reader and a transponder, the reader generates a magnetic field by way of its antenna, which is generally a sinusoidal wave (the carrier) at 13.56 MHz in the standards that are conventionally used.

To transmit information from the reader to the transponder, the reader uses an amplitude modulation of said carrier.

The transponder, for its part, includes a processing circuit configured to demodulate the received carrier in order to obtain the data transmitted from the reader.

For a transmission of information from the transponder to the reader, the reader generates the magnetic field (the carrier) without modulation. The antenna of the transponder then modulates the field generated by the reader, on the basis of the information to be transmitted. The frequency of this modulation corresponds to a subcarrier of said carrier. The frequency of this subcarrier depends on the communication protocol that is used, and may, for example, be equal to 848 kHz.

This modulation is performed by modifying the load connected to the terminals of the antenna of the transponder.

Two modes of operation are then possible, a passive mode or an active mode.

In passive mode, the transponder backscatter-modulates the wave coming from the reader in order to transmit information and, to transmit the information, does not incorporate transmission means as such, or a transmitter, that is capable, for example, of generating its own magnetic field during the transmission. Such a transponder without a transmitter is called a passive transponder, in contrast to an active transponder which includes a transmitter.

Generally, a passive transponder does not have a power supply, because it uses the wave coming from the reader to power its integrated circuit.

In some applications, the passive transponder may incorporate a power supply, for example a cell.

In the active mode of operation, the reader and the transponder, called active transponder, both generate an electromagnetic field. In general, this mode of operation is used when the active transponder is provided with a dedicated power source, for example a battery.

Each of the NFC devices (reader and transponder) transmits the data using a modulation scheme.

In this case too, the modulation is reflected by a load modification, and reference is then made to communication through active load modulation.

In comparison with a passive communication mode, greater operating distances are obtained, which may range as far as 20 cm depending on the protocol that is used. By increasing the size of the antenna of the reader and/or the sensitivity of the reader, it is then possible to increase the distance up to distances possibly ranging up to several tens of centimeters, for example 60 cm.

Moreover, the use of active load modulation makes it possible to use very small antennas.

Embodiments disclosed herein apply equally to passive transponders and to active transponders.

Monitoring the relative positioning of two objects that are movable in relation to one another may prove to be useful, or even important, in certain applications, for example on assembly lines or when testing for correct operation, without being limited to these examples.

There is therefore a need to provide a straightforward and easily implemented solution for monitoring such relative positioning between a first object and a second object.

SUMMARY

In a first implementation and embodiment, what is proposed is to fit the first object with a contactless transponder and to use contactless communication between the transponder and a reader.

When the second object is itself also fitted with a contactless antenna, it may be that just coupling the respective antennas of the two objects will prove to be insufficient for monitoring the relative positioning of the two objects accurately, since even if the two antennas are not facing one another, coupling may still take place between the two antennas, allowing contactless communication.

There is therefore a need to improve the monitoring of this relative positioning.

There is also a need to be able to monitor the relative positioning of the two objects effectively even when the second object is not fitted with a contactless reader.

There is a further need to be able to ascertain the authenticity of the object fitted with the transponder.

According to one aspect, what is proposed is a system comprising: a module having a contactless reader function;

a first object including a transponder comprising an integrated circuit that has two terminals which may or may not be shorted, the module and the transponder being configured to communicate with one another using a contactless communication protocol; a second object, the two objects being movable in relation to one another; and shorting circuitry that are located at least partly on said second object and configured to short or not to short the two terminals depending on the relative positioning of the two objects, the transponder being configured to transmit, to said module, positioning information corresponding to said relative positioning.

Thus, according to this aspect, the use of these two terminals and the detection of their potential shorting caused at least partly by the second object provides, in combination with the transmission of the positioning information by means of contactless communication, a straightforward and effective solution for monitoring the relative positioning of the two objects.

Additionally, this positioning information may also, in some cases, be representative of wear on the first object, for example when this first object is a brake pad or a pair of brake pads, and the second object is a brake disc.

According to one embodiment, the integrated circuit comprises: a register for containing said positioning information; and a processing circuit that is configured to detect a potential short circuit between the two terminals and to assign a first value to said positioning information when the two terminals are shorted and a second value when the two terminals are not shorted.

For example, the two terminals being shorted corresponds to a first relative positioning of the two objects, and the two terminals not being shorted corresponds to at least one second relative positioning of the two objects, different from the first positioning.

According to a first variant, the shorting circuitry include a trigger circuit, which is configured to establish or not to establish a short circuit between the two terminals and are located on the second object.

According to one embodiment which is compatible with this first variant, the trigger circuit comprises electrically conductive circuitry.

For example: the trigger circuit comprises, on the second object, two electrically conductive zones that are linked by an electrically conductive linking element, the two zones and the two terminals being arranged such that the two zones and the two terminals respectively become mutually electrically coupled in said first positioning and such that the two zones and the two terminals do not respectively become mutually electrically coupled in said at least one second positioning.

According to another possible example, which is compatible, for example, with an operation of detecting brake-pad wear: the trigger circuit comprises an electrically conductive wall of the second object, the two terminals and said wall being arranged such that said wall and the two terminals are mutually electrically coupled in said first positioning and such that said wall and the two terminals are not mutually electrically coupled, for example mutually separated, in said at least one second positioning.

According to a second possible variant, said first object comprises a first portion of the trigger circuit and the second object comprises a second portion of the trigger circuit.

According to one embodiment which is compatible with this second variant, the trigger circuit comprises electromagnetic circuitry.

For example: the second portion of the trigger circuit comprises a magnetic element that is configured to generate a magnetic field; and the first portion of the trigger circuit comprises a switch, controllable by the magnetic field, which is connected between the two terminals, the magnetic element and the switch being mutually arranged such that, in the first positioning, the switch is closed in the presence of said magnetic field, and such that the switch is open in said at least one second positioning.

According to another possible embodiment which is compatible with this second variant, the trigger circuit comprises electro-optical circuitry.

For example: the second portion of the trigger circuit comprises two interfaces that are linked by a light-guide; the first portion of the trigger circuit comprises a light generator and a receiver block including a photo-element which is connected to the two terminals of the integrated circuit and configured to short these two terminals when the photo-element receives light, the interfaces, the light generator and the photo-element being arranged such that, in said first positioning, one of the interfaces faces the light generator and the other interface faces the photo-element, and such that, in said at least one second positioning, the two interfaces do not face the light generator and the photo-element, respectively.

Whichever the variant, the second object may comprise said module.

In this case (the transponder including a transponder antenna and the module including a module antenna), the transponder antenna, the two terminals of the integrated circuit and the module antenna are advantageously arranged such that the module antenna and the transponder antenna face one another when the two terminals are shorted.

The two terminals being shorted may then be representative of both good relative positioning of the two objects and good magnetic coupling of the two antennas, providing good contactless communication quality.

Detecting the short circuit between the two terminals may thus simply be a way of detecting good relative positioning of the two antennas and hence good coupling between the two antennas.

According to another possible configuration, which is compatible with any variant, said second object may be distinct from said module.

For this, it is possible to envisage a cellular mobile telephone incorporating said module.

In other words, it is then possible to monitor the relative positioning of the two objects easily by polling the transponder using the cellular mobile telephone, for example a smartphone, and for example in contactless-reader emulation mode.

According to one embodiment, the transponder includes at least one identifier of the first object, and the module is configured to perform an operation of authenticating the first object on the basis of said identifier and to deliver a first indication as to whether said identifier has been authenticated and whether said positioning information has the first value.

It is then possible both to authenticate the first object and to monitor the relative positioning of the two objects accurately.

According to another aspect, what is proposed is a method for monitoring the relative positioning of a first object and of a second object that are movable in relation to one another, the first object including a transponder comprising an integrated circuit that has two terminals which may or may not be shorted.

The method according to this aspect comprises an operation of detecting the presence or absence of a short circuit between the two terminals which is established at least partly by the second object depending on the relative positioning of the two objects, and an operation of the transponder transmitting, to a module having a contactless reader function, positioning information corresponding to said relative positioning using a contactless communication protocol.

According to one implementation, the method comprises: detecting the potential short circuit between the two terminals; assigning a first value to said positioning information when the two terminals are shorted and a second value when the two terminals are not shorted; and storing the positioning information within the transponder.

According to one implementation, the two terminals being shorted corresponds to a first relative positioning of the two objects, and the two terminals not being shorted corresponds to at least one second relative positioning of the two objects, different from the first positioning.

The presence or absence of the short circuit may be established solely by the second object.

As a variant, the presence or absence of the potential short circuit may be established by cooperation between a first portion of the trigger circuit, which is connected between the two terminals of the integrated circuit, and a second portion of the trigger circuit, which is located on the second object.

The second object may comprise said module or be distinct from said module.

In this last case, a cellular mobile telephone may incorporate said module.

When the transponder includes at least one identifier of the first object, the module may perform an operation of authenticating the first object on the basis of said identifier and deliver a first indication as to whether said identifier has been authenticated and whether said positioning information has the first value.

BRIEF DESCRIPTION OF THE DRAWINGS

Other advantages and features of the invention will become apparent on examining the detailed description of completely non-limiting embodiments and modes of implementation, and the appended drawings, in which.

DETAILED DESCRIPTION

Figure 1:
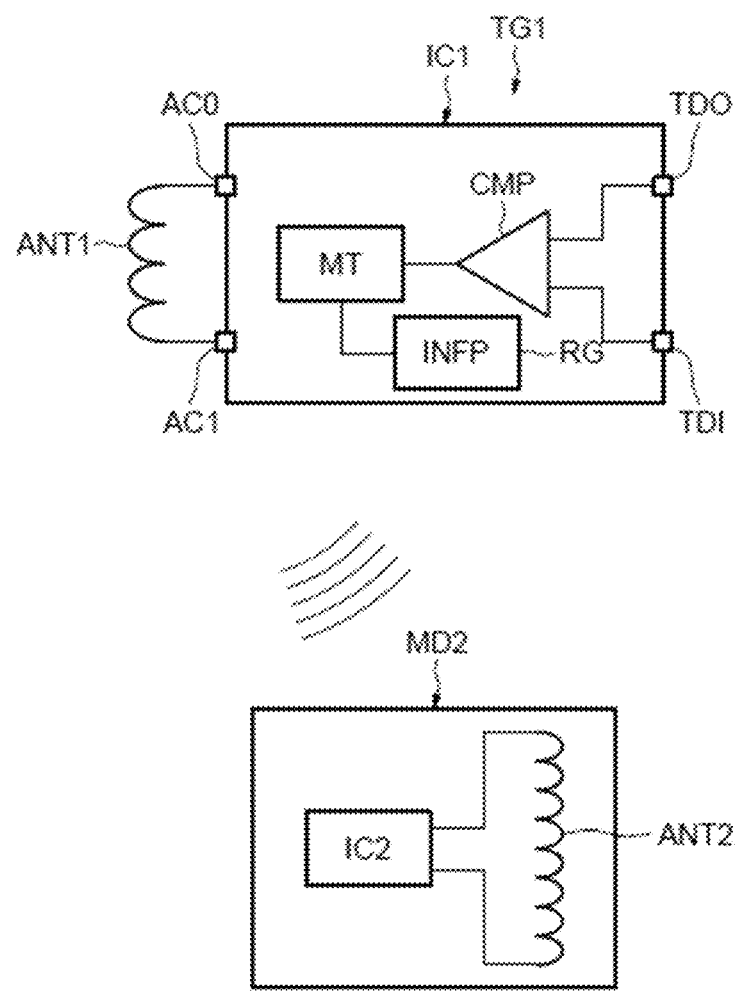
FIG. 1 is a block diagram of a contactless communications system.

In FIG. 1, the reference TG1 denotes a contactless passive transponder, for example a tag. In this example, the contactless passive transponder is configured to communicate with a module MD2 having a contactless reader function via its antenna, referred to hereinafter as the "transponder antenna", ANT1 by using a carrier signal having a frequency of, for example, 13.56 MHz.

The structure of the module MD2 is conventional and known per se and includes in particular an integrated circuit IC2 coupled to an antenna, referred to hereinafter as the "module antenna", ANT2.

The two antennas ANT1 and ANT2 are intended to cooperate with one another in order to allow a dialogue between the transponder and the module using a contactless communication protocol.

The passive transponder is in this case a transponder that is capable of communicating using the contactless communication protocol that uses near-field communication (NFC) technology, for example.

This transponder may also be an RFID transponder using this NFC technology.

This transponder TG1 comprises an integrated circuit IC1, for example an integrated circuit of the ST25 family marketed by STMicroelectronics.

The integrated circuit IC1 includes two input terminals AC0 and AC1 that are respectively connected to the two terminals of the transponder antenna ANT1.

The integrated circuit IC1 also includes processing circuit MT, including for example an energy recovery circuit, a microprocessor and/or a wired logic unit, and also a memory, which processing circuit are configured so as to: deliver a supply voltage to the entire integrated circuit on the basis of the magnetic field received from the module MD2, and process the information received from the module and backscatter-modulate the carrier signal for the purpose of transmitting information to the module MD2.

The integrated circuit IC1 also includes two terminals TDO and TDI and, in this example, a comparator circuit CMP that is configured to compare the voltage present on the terminal TDO with the voltage present on the terminal TDI and to deliver the result of this comparison to the processing circuit MT in order to detect whether the two terminals TDO and TDI have been shorted or not by shorting circuitry. Greater detail regarding the structure of this circuit and operation will be provided below.

The processing circuit MT is, for example, configured to deliver a reference voltage on one of the terminals, for example the terminal TDO. If the two terminals are shorted, the voltage present on the other terminal, for example the terminal TDI, depends on the reference voltage, on the resistance of the shorting circuitry and on a pull-down resistor connected between the terminal TDI and ground.

Assuming the resistance of the shorting circuitry and a pull-down resistance of about 20 kiloohms, a reference voltage is chosen such that the voltage on the terminal TDI is within a range of values leading, for example, to a first logic value, for example a logic "1", being delivered at the output of the comparator CMP.

By contrast, if the two terminals are not shorted, the voltage on the terminal TDI will be close to or equal to 0 (ground), leading to a second logic value, for example a logic "0", being delivered at the output of the comparator CMP.

Of course, it would be possible as a variant to detect the potential shorting of the two terminals TDO and TDI by injecting a current into one of the terminals and detecting the presence or absence of this current in the other terminal.

The integrated circuit IC1 also includes a register RG for containing positioning information INFP, the meaning of which is now explained with reference to FIG. 2.

Generally, the transponder TG1 is incorporated within or located on a first object which is movable in relation to a second object, which may or may not include the reader module MD2.

It is during the relative movement between the two objects that the two terminals TDO and TDI may or may not be shorted.

The potential electrical shorting of these two terminals therefore provides positioning information INFP that is representative of the relative positioning of the two objects.

Figure 2:
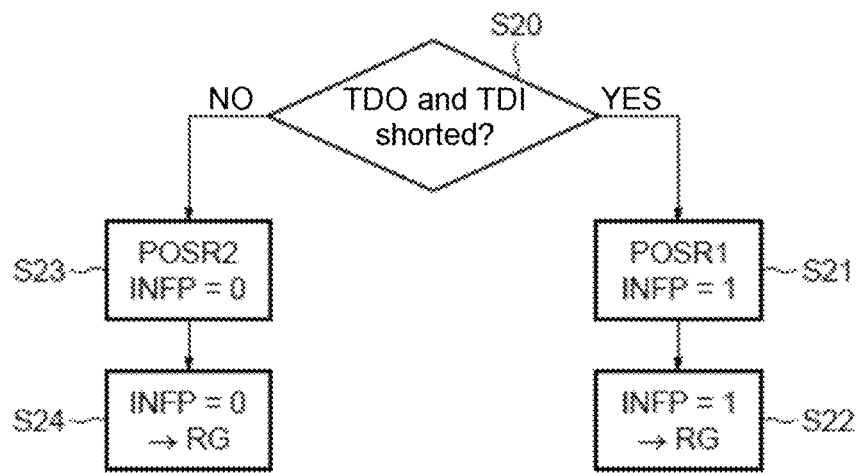
FIG. 2 is a flow diagram of a method of operation.

Thus, as illustrated in FIG. 2, if, in step S20, it appears that the two terminals TDO and TDI have been shorted, then the processing circuit assigns the logic value 1 to the positioning information INFP which is then representative of a first relative positioning POSR1 of the two objects (step S21).

The processing circuit MT then stores, in step S22, the value of this positioning information INFP in the register RG.

If however, in step S20, it turns out that the two terminals TDO and TDI have not been electrically shorted, the processing circuit assigns, in step S23, the logic value 0 to the positioning information INFP, which corresponds to at least one second relative positioning POSR2 of the two objects, which is different from the first relative positioning POSR1.

The processing circuit MT of the transponder stores the logic value 0 in the register RG (step S24).

Figure 3:
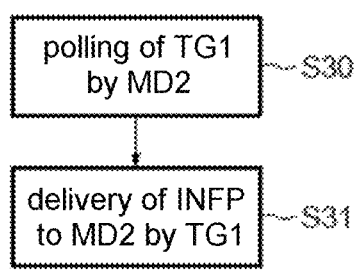
FIG. 3 is a flow diagram of a method for delivering position information.

As illustrated in FIG. 3, the positioning information INFP, and more specifically its value, is delivered by the transponder TG1 to the module MD2 during a contactless communication.

More specifically, in step S30, the module MD2 polls the transponder TG1 and the transponder TG1, for example by means of backscatter modulation, delivers the value of the positioning information INFP to the module MD2 in step S31.

Figure 4:
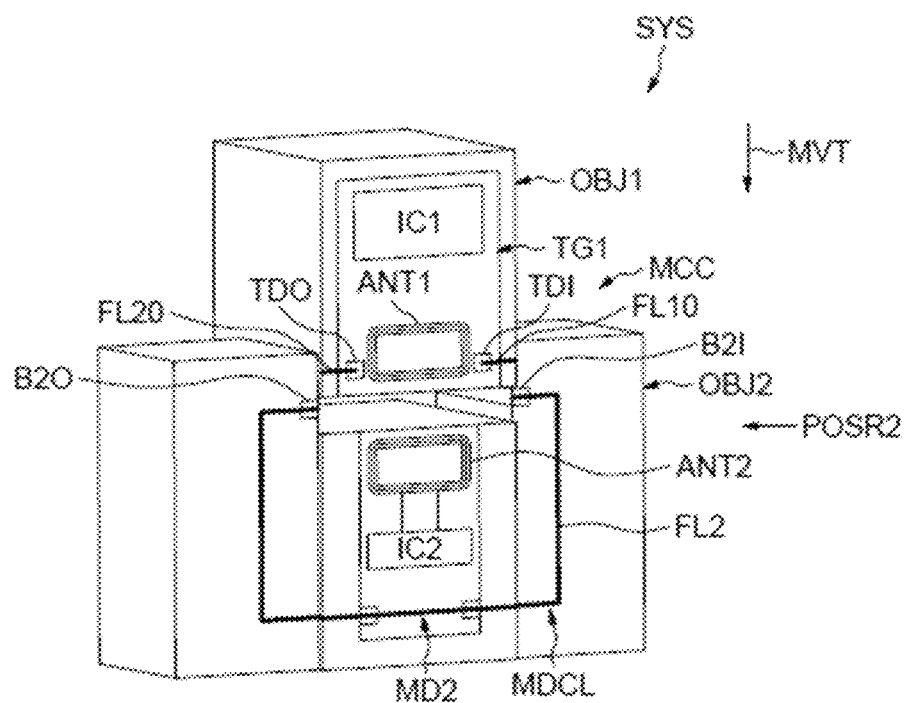
FIGS. 4 and 5 illustrate configurations of a system including two objects at different relative positions.
Figure 5:
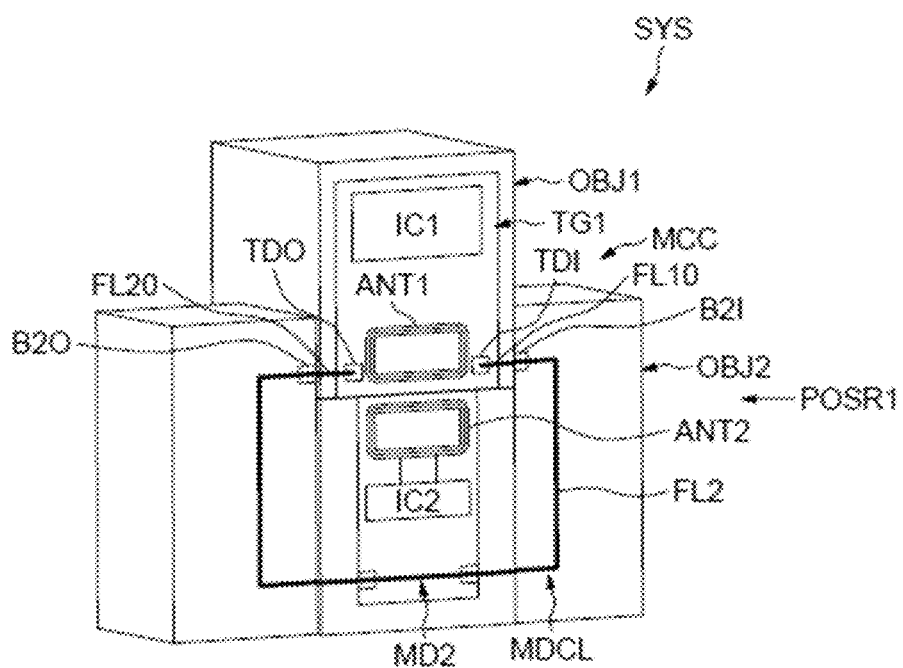

Reference is now made more particularly to FIGS. 4 and 5 in order to illustrate a first embodiment that is applicable, for example, to verifying the positioning between two objects.

More specifically, as illustrated in FIG. 4, the system SYS includes a first object OBJ1 and a second object OBJ2, these two objects being movable in relation to one another. In this example, the movement MVT of the first object OBJ1 is represented by the vertical arrow.

In this example, the first object OBJ1 is intended to be inserted into a portion of the second object OBJ2 and what is envisaged in this case is to monitor the correct insertion of the object OBJ1 into the object OBJ2.

In this example, the first object OBJ1 includes the transponder TG1 while the second object OBJ2 includes the module MD2 having the contactless reader function.

Furthermore, in this example, the electrical shorting circuitry MCC, which forms a shorting circuit path for electrically shorting the two terminals TDO and TDI of the transponder to each other include trigger circuit MDCL, are located in the second object OBJ2.

More specifically, the trigger circuit MDCL includes in this case, in the second object OBJ2, two metal zones B2O and B2I that open onto the walls of the first object OBJ1 sliding into the second object OBJ2.

These two zones B2O and B2I are linked together by an electrically conductive linking circuit FL2, for example a wire or metallization as part or all of the shorting circuit path.

The shorting circuitry MCC also includes, on the first object OBJ1, two other wires or metallizations FL10 and FL20 as parts of the shorting circuit path that link the two terminals TDI and TDO to the sliding wall of the first object OBJ1.

Of course, the illustration of FIG. 4 is highly schematic and a person skilled in the art will be able to adapt such a schematic illustration for a practical embodiment of these various means.

In FIG. 4, the two terminals TDO and TDI are not shorted, which corresponds to a second relative positioning POSR2 of the two objects.

Conversely, in FIG. 5, which illustrates correct insertion of the first object OBJ1 into the second object OBJ2, and hence the first relative positioning POSR1, the two terminals TDO and TDI are electrically shorted to each other due to the shorting circuit path provided by the electrical cooperation between the two zones B2O and B2I and the wires FL20 and FL10 and hence the two terminals TDO and TDI.

In this context, the shorting circuit path shorting circuitry MCC presents a very small short circuit impedance that is less than 100 ohm, and more particular is at or less than 50 ohm.

Figure 6:
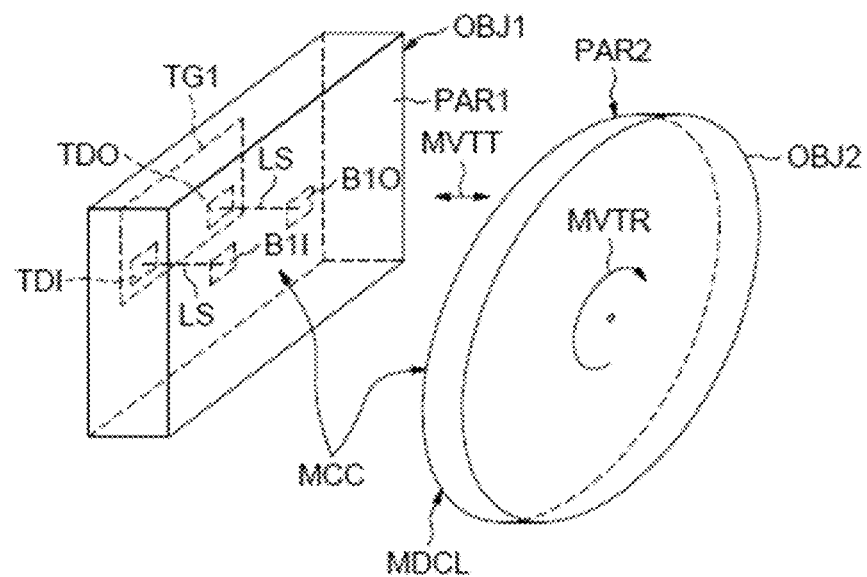
FIGS. 6, 7 and 8 illustrate an embodiment and implementation applicable for detecting wear on an object.
Figure 7:
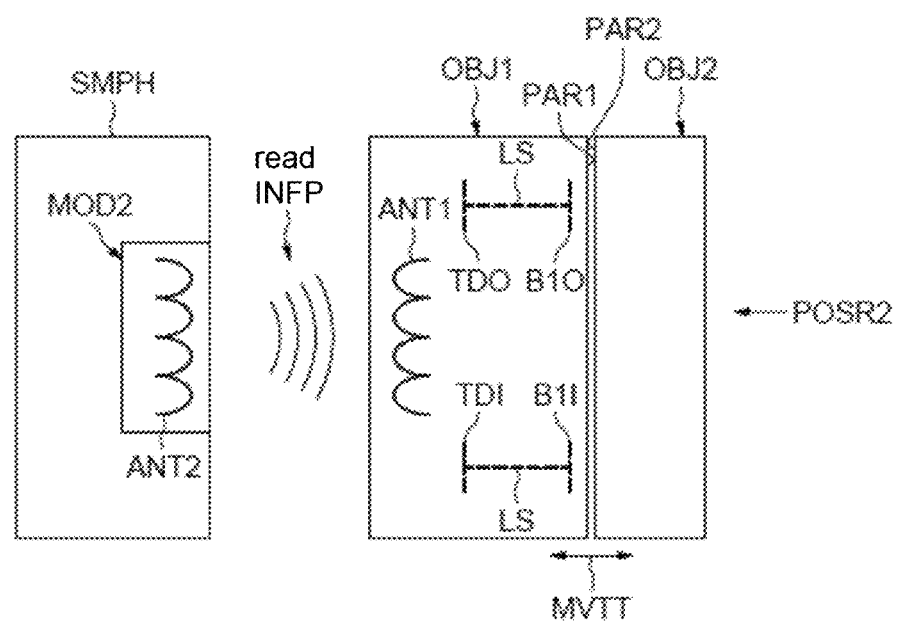
Figure 8:
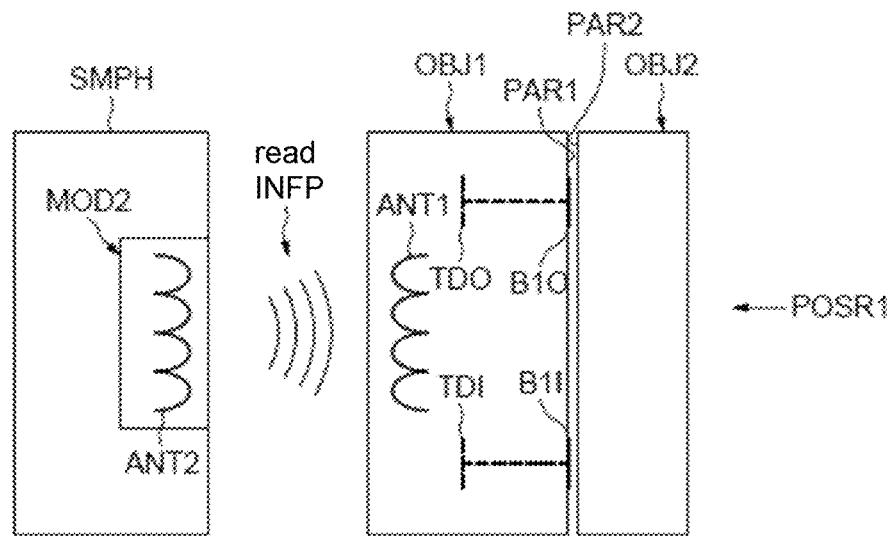

Reference is now made more particularly to FIGS. 6, 7 and 8 in order to illustrate another embodiment and implementation that is applicable, for example, to detecting wear on an object, for example a brake pad.

Thus, in this example with FIGS. 6, 7 and 8, the first object OBJ1 is a brake pad while the second object OBJ2 is a brake disc that moves in rotation MVTR about its axis.

When braking, the brake pad OBJ1 approaches the disc OBJ2 via a transverse motion MVTT.

In this example, the transponder TG1 is inserted into the brake pad OBJ1.

Provision is also made for two additional terminals B1O and B1I that are linked to the two terminals TDO and TDI, respectively, via electrically conductive links LS.

These two additional terminals B1O and B1I are located a certain distance away from a friction wall PAR1 of the brake pad OBJ1, i.e., embedded within the body of the pad material.

As will be seen in greater detail with reference to FIGS. 7 and 8, the shorting circuitry MCC comprises in this case the metal wall PAR2 of the disc OBJ2 that is located facing the friction wall PAR1 of the pad OBJ1, and the two additional terminals B1O and B1I and the metal links LS. As regards the trigger circuit MDCL, this is comprised by the metal wall PAR2.

In FIG. 7, illustrating a second relative positioning POSR2 of the disc OBJ2 in relation to the brake pad OBJ1, the two terminals TDO and TDI are not shorted.

Specifically, when the metal wall PAR2 comes into contact with the friction wall PAR1 of the brake pad, and since the latter is not worn, the metal wall PAR2 does not reach the two additional terminals B1O and B1I.

Since the two terminals TDO and TDI are not shorted, the positioning information INFP, which in this case is in fact information on wear, has the logic value 0.

It is then possible for a user to check whether these brake pads are worn and have to be changed.

For this, with the vehicle at standstill and the pad in contact with the disc, the user may use, for example, a cellular mobile telephone SMPH, such as a smartphone, in reader emulation mode and thus including the module MOD2 for polling the transponder TG1 housed in the brake pad OBJ1 and obtain information INFP via contactless communication between the transponder antenna ANT1 and the module antenna ANT2.

FIG. 8 illustrates, in a highly schematic manner, the case in which the brake pad OBJ1 has reached such a degree of wear that it should be changed.

This corresponds to the first relative positioning POSR1 between the object OBJ1 and the object OBJ2. In this positioning, the metal wall PAR2 comes into contact with the friction wall of the brake pad OBJ1 and into contact with the two additional terminals B1O and B1I, and therefore shorts them.

As a result, the two terminals TDO and TDI are shorted.

When reading the positioning information INFP using the telephone SMPH in reader emulation mode, the user will see the value 1 for the information INFP, which will indicate to them that the brake pad has to be changed.

Figure 9:
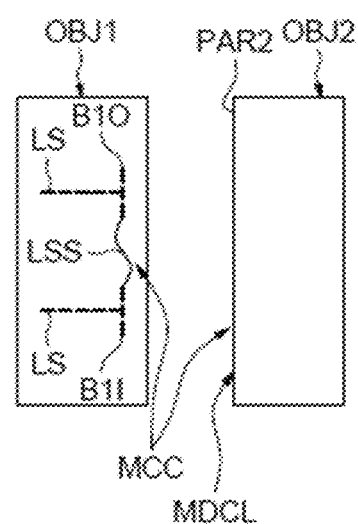
FIGS. 9 and 10 illustrate an alternate embodiment and implementation applicable for detecting wear on an object.
Figure 10:
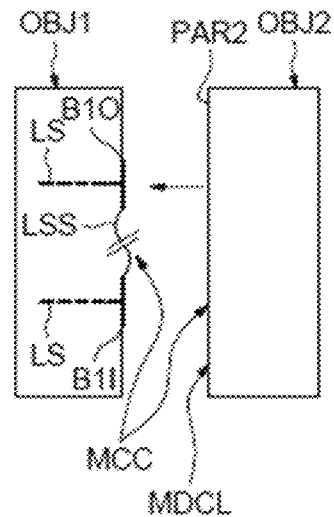

It would also be possible, as a variant, as illustrated in a highly schematic manner in FIGS. 9 and 10, for the two terminals TDO and TDI being shorted, i.e., the two additional terminals B1O and B1I being shorted, to correspond to a state of non-wear of the brake pad and these terminals not being shorted to correspond to wear on the brake pad leading to it being changed.

For this, as illustrated in FIG. 9, corresponding to a state of non-wear on the brake pads, the two additional terminals B1O and B1I are connected by an additional electrical link LSS, for example an electrically conductive wire embedded in the pad OBJ1.

The shorting circuitry MCC then include this wire LSS and the wall PAR2 of the object OBJ2.

The trigger circuit MDCL includes the wall PAR2.

In the configuration of FIG. 9, the shorting circuitry MCC shorts the two additional terminals B1O and B1I.

Conversely, in the configuration of FIG. 10, when the brake pad OBJ1 is worn, the wall PAR2 of the brake disc OBJ2 will, when braking, cut through or even completely destroy at least the additional wire LSS and possibly the two additional terminals B1O and B1I, which will consequently break the short circuit between the two terminals TDO and TDI.

The shorting circuitry MCC are therefore in this case configured to break, via the trigger circuit, the initial short circuit between the two terminals TDO and TDI. In other words, the trigger circuit PAR2 in this embodiment does not set up a short circuit between the two terminals TDO and TDI when the brake pad is worn.

Figure 11:
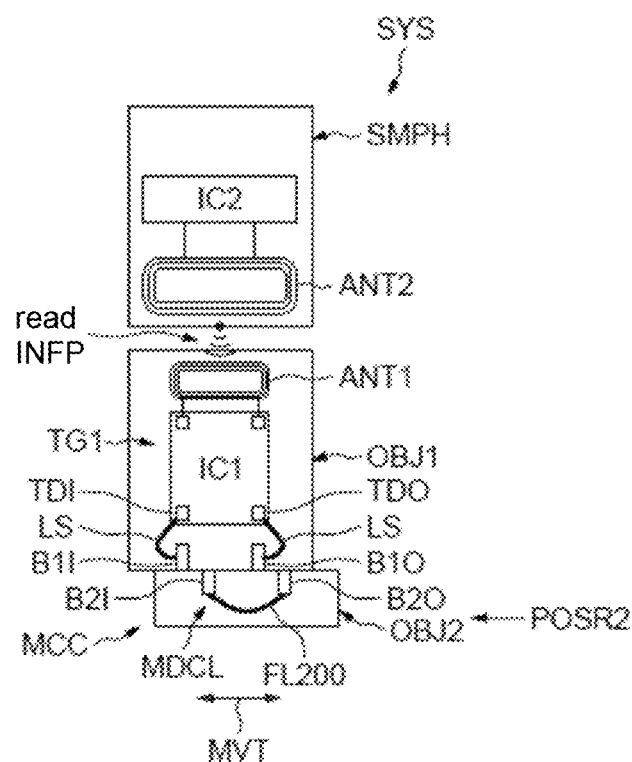
FIGS. 11 and 12 illustrate, in a highly schematic manner, another implementation and embodiment.
Figure 12:
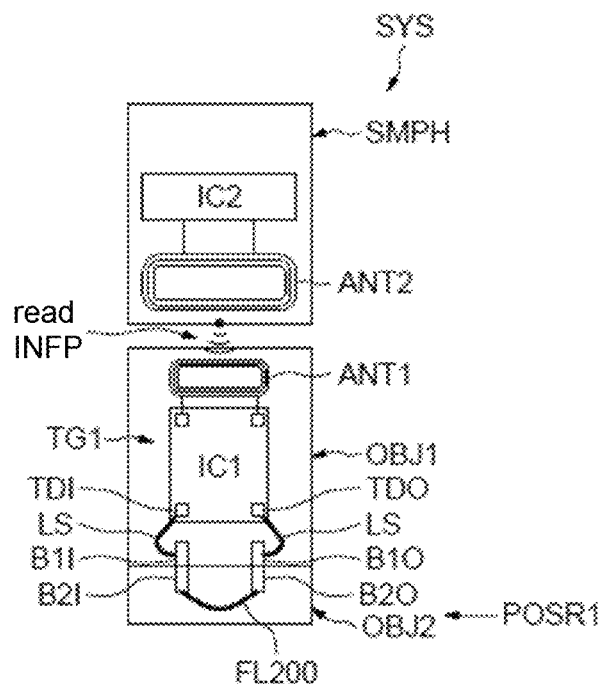

Reference is now made more particularly to FIGS. 11 and 12 which illustrate, in a highly schematic manner, another implementation and embodiment.

More specifically, as illustrated in FIG. 11, the system SYS includes in this case the first object OBJ1 incorporating the transponder TG1, and the second object OBJ2.

The two objects OBJ1 and OBJ2 are movable in relation to one another by the movement MVT.

The second object OBJ2 does not include the reader module MD2.

Specifically, the positioning information INFP will be read by an external reader, for example, like in the previous case, a cellular mobile telephone SMPH in reader emulation mode, the module antenna ANT2 of which will be magnetically coupled to the transponder antenna ANT1.

The object OBJ1 further includes two additional metal terminals B1O and B1I that are electrically connected to the two terminals TDO and TDI, respectively, by two electrically conductive linking circuits LS.

As regards the object OBJ2, it includes two metal zones B2O and B2I that are electrically connected by an electrically conductive linking circuit FL200.

The trigger circuit MDCL therefore includes in this case the two zones B2O and B2I and the linking circuit FL200.

The shorting circuitry includes the trigger circuit MDCL, the two additional metal terminals B1I and B1O, and the linking circuit LS.

These trigger circuit MDC are configured: either, as illustrated in FIG. 11, so as not to come into contact with the two additional terminals B1I and B1O so as not to short the two terminals TDI and TDO, which corresponds to a second positioning POSR2, or, as illustrated in FIG. 12, to come into contact with the two additional terminals B1I and B1O in order to short the two terminals TDI and TDO, which then corresponds to the first relative positioning POSR1.

In this way, it is possible to monitor the relative positioning of the two objects OBJ1 and OBJ2.

Figure 13:
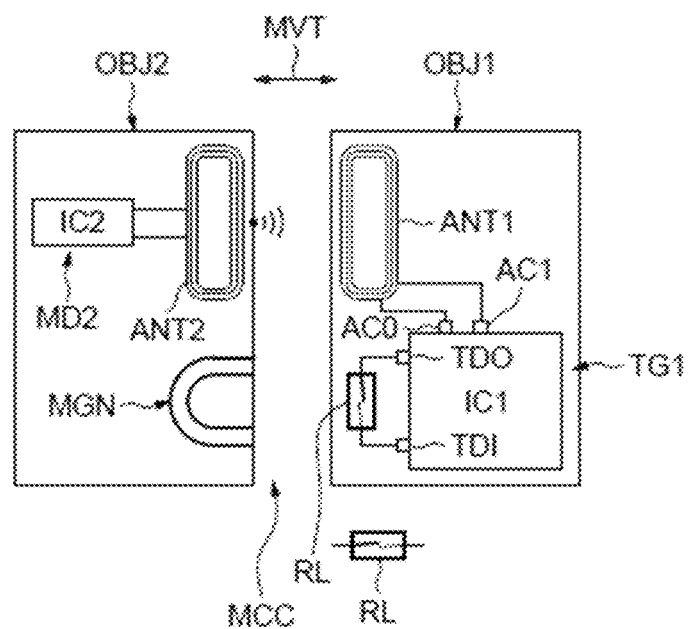
FIGS. 13 and 14 illustrate another implementation and embodiment.
Figure 14:
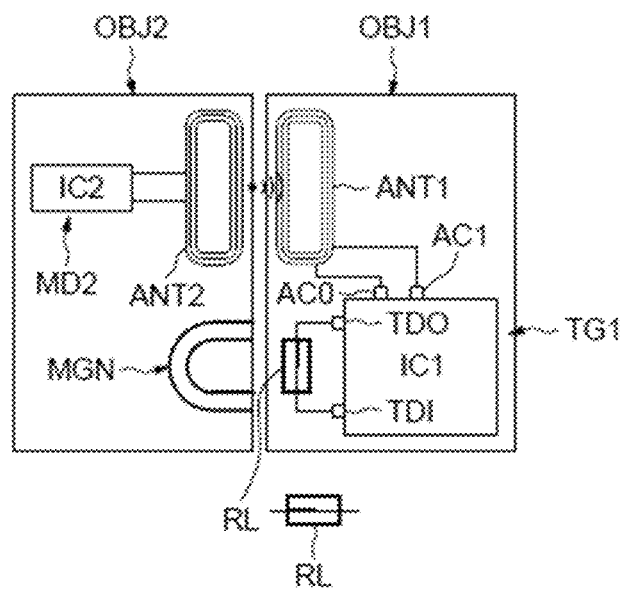

Reference is now made more particularly to FIGS. 13 and 14 in order to illustrate another implementation and embodiment.

More specifically, the trigger circuit MDCL is in this case electromagnetic circuitry including: on the second object OBJ2 which incorporates in this case the module MD2, an element MGN generating a magnetic field, and on the first object OBJ1 which incorporates the transponder TG1, a switch, such as a reed switch, RL that is connected between the two terminals TDO and TDI.

Such electromagnetic components are known per se by a person skilled in the art.

Thus, as illustrated in FIG. 13, when the switch RL is not subjected to the magnetic field generated by the magnet MGN, which corresponds to a poor positioning of the object OBJ2 in relation to the object OBJ1 (positioning POSR2), the switch RL is open corresponding to no short circuit between the two terminals TDO and TDI.

Conversely, as illustrated in FIG. 14, with correct positioning of the object OBJ2 in relation to the object OBJ1, the switch RL is then subjected to the magnetic field generated by the magnet MGN.

This switch RL is then in a closed state which allows the two terminals TDO and TDI to be shorted.

Figure 15:
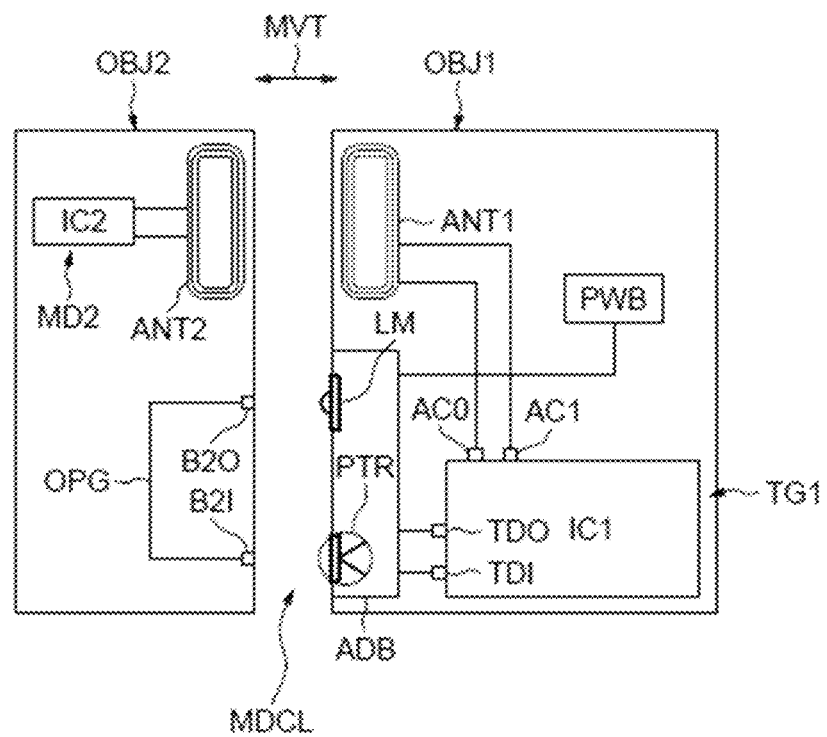
FIGS. 15 and 16 illustrate another implementation and embodiment utilizing electro-optical circuitry for triggering.
Figure 16:
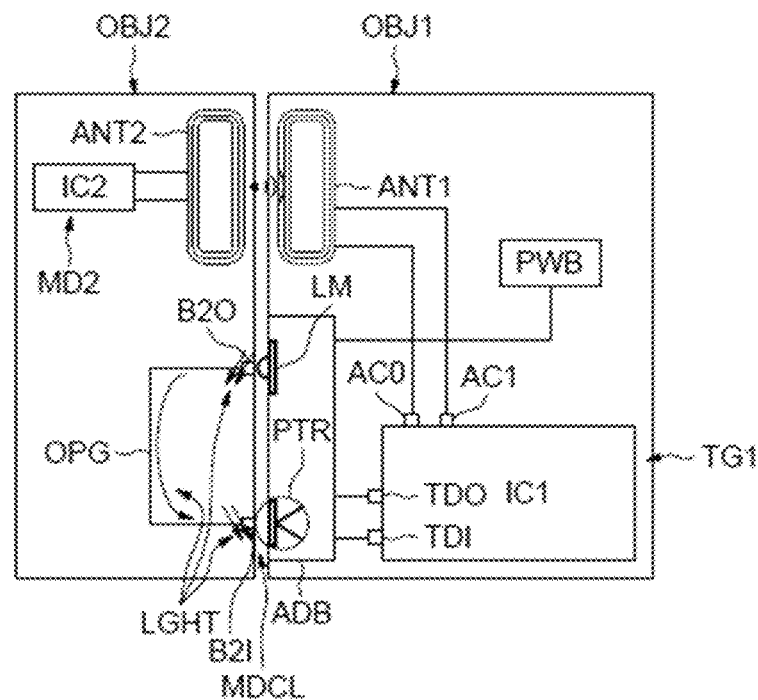

It is also possible, as a variant, as illustrated in a highly schematic manner in FIGS. 15 and 16, to envisage electro-optical circuitry as the trigger circuit MDCL.

More specifically, the electro-optical trigger circuit includes, on the first object OBJ1, which also incorporates the transponder TG1, a light emitter LM, for example a light-emitting diode, a phototransistor PTR that is coupled to the two terminals TDO and TDI and a matching block ADB.

Such circuits are conventional in structure and well known to a person skilled in the art.

These elements are furthermore supplied with power by a power supply block PWB.

The phototransistor PTR includes two states, namely an open state in which it does not short the two terminals TDO and TDI and a closed state in which it does short the two terminals TDO and TDI.

The open state is obtained when the transistor PTR is not illuminated by incident light and the closed state is obtained when this same transistor is illuminated by incident light.

The electro-optical trigger circuit MDCL further includes, on the second object OBJ2, which in this example also incorporates the module MD2, two interfaces B2O and B2I that are linked by an optical waveguide OPG.

Thus, as illustrated in FIG. 15, when the second object OBJ2 is not correctly positioned in relation to the first object OBJ1, the light emitted by the light-emitting diode LM does not reach the phototransistor PTR and the two terminals TDO and TDI are not shorted.

Conversely, when the second object is correctly positioned in relation to the first object, the incident light LGHT emitted by the light-emitting diode LM reaches the phototransistor PTR via the two interfaces B2O and B2I and the optical waveguide OPG.

The two terminals TDO and TDI are then shorted.

In the embodiments which have been described above and envisage incorporating the module MD2 within the second object OBJ2, it should be noted that the transponder antenna ANT1 and the module antenna ANT2 are arranged so as to face one another when the two terminals TDO and TDI are shorted.

Thus, a first correct positioning POSR1 corresponds to effective coupling between the two antennas.

Figure 17:
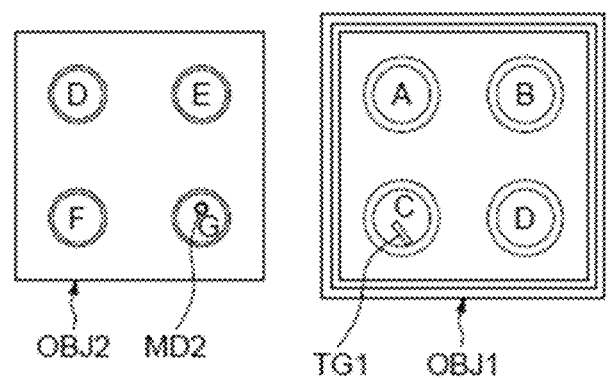
FIGS. 17 and 18 illustrate another implementation and embodiment.
Figure 18:
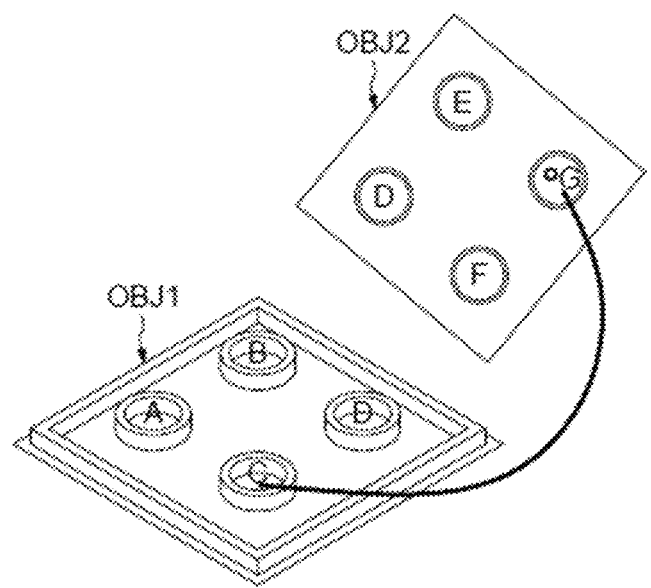

FIGS. 17 and 18 illustrate another application.

More specifically, the first object OBJ1 includes four regions A, B, C, D and the second object OBJ2 also includes four regions D, E, F, G.

During assembly, the region C of the first object OBJ1 should come to face the region G of the second object OBJ2.

To ensure such correct positioning, it is then possible, by using one of the embodiments described above, to place, for example, the module MD2 in the region G and the transponder TG1 in the region C with the corresponding shorting circuitry.

When the placement is correct, as illustrated in FIG. 18, the two terminals TDO and TDI of the transponder TG1 will then be shorted.

Figure 19:
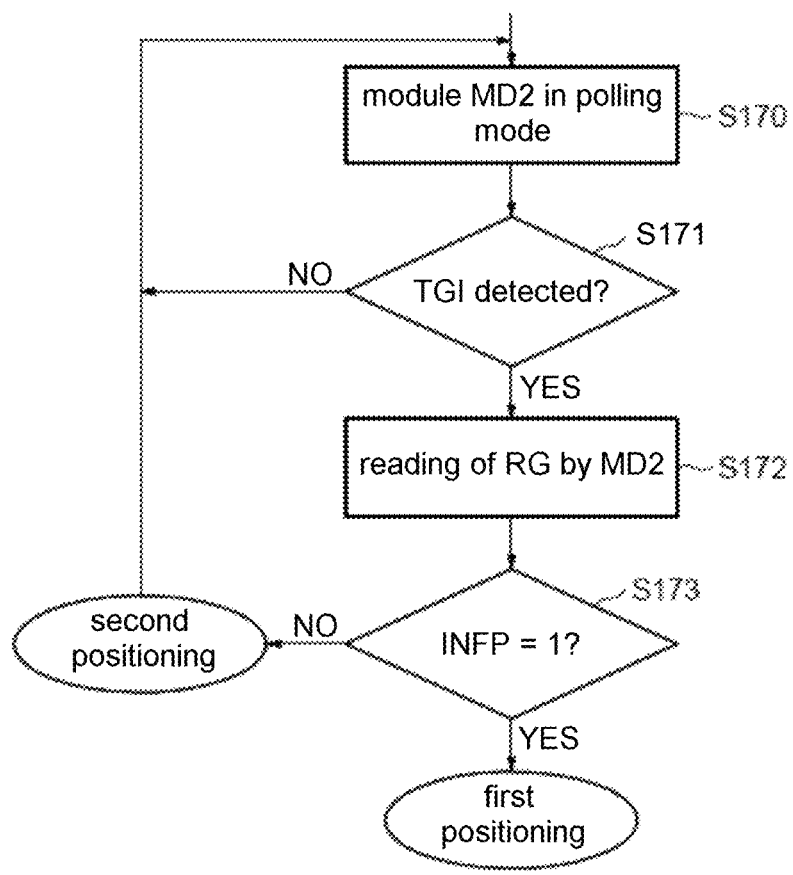
FIG. 19 is a flow diagram of a method of operation.

FIG. 19 schematically illustrates one implementation of a method of operation.

Thus, in general, in step S170, the module MD2 is set to polling mode.

In a conventional and known manner, by using the contactless communication protocol, the module MD2 carries out a step of detecting the presence of the transponder TG1 in the magnetic field emitted by its module antenna (step S171).

In the absence of detection, the module MD2 is set to polling mode again.

Conversely, if the transponder TG1 is detected, then the module MD2 proceeds to read the content of the register RG (step S172).

As mentioned above, the value of the positioning information INFP contained in the register RG is delivered by the transponder to the module MD2 by means of backscatter modulation.

The module MD2 then checks, in step S173, the logic value of the positioning information INFP.

If this positioning information INFP has the logic value 1, then the relative positioning of the two objects OBJ1 and OBJ2 is considered to be a first relative positioning, for example a correct relative positioning in some envisaged applications, while it is considered to be a second relative positioning, different from the first positioning, for example an incorrect relative positioning, if the positioning information INFP has the logic value 0.

Figure 20:
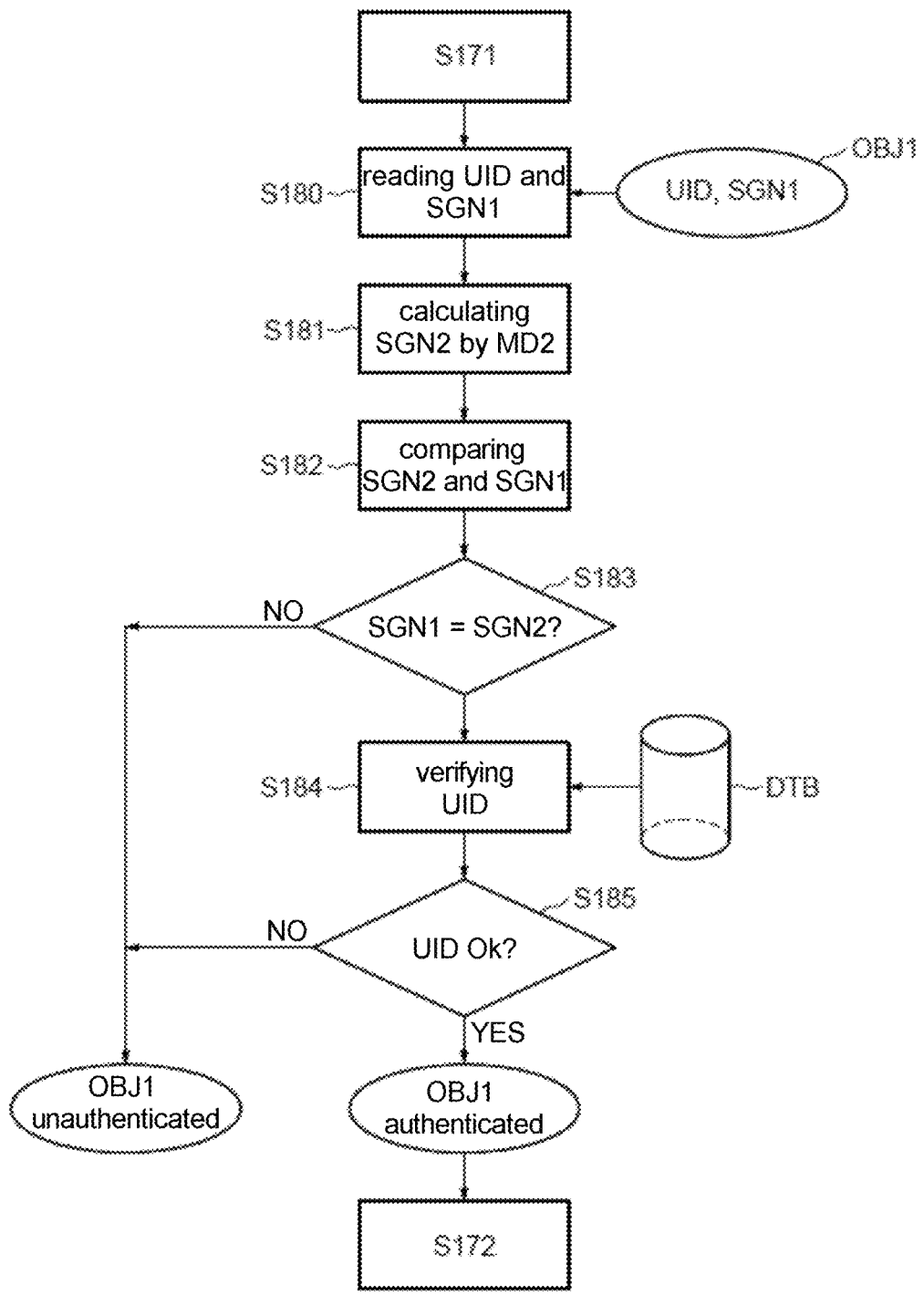
FIG. 20 is a flow diagram of a method of operation.

As a variant, as illustrated in FIG. 20, it is possible to combine this operation of detecting a first relative positioning with a step of authenticating the object OBJ1.

More specifically, after step S171 in FIG. 19, the module MD2 reads, in a step S180, an identifier UID and a signature SGN1 which are stored in a memory means of the transponder located on the first object OBJ1.

Then, in step S181, the module MD2 recalculates a signature SGN2 on the basis of the obtained identifier UID.

In step S182, a comparison is performed between the two signatures SGN1 and SGN2.

If, in step S183, the two signatures are not identical, then the object OBJ1 is considered to be unauthenticated.

However, if the two signatures SGN1 and SGN2 are identical, then it is possible to move on, in a step S184, to an operation of verifying the identifier UID of the first object OBJ1 by checking with a database DTR for example.

If, in step S185, the identifier UID is considered to be invalid, because for example it does not appear in the database DTR, then, as above, the object OBJ1 is considered to be unauthenticated, while, if this identifier UID is considered to be valid, because it does feature in the database DTR, then the object OBJ1 is considered to be authenticated and the method may move on to step S172 in FIG. 19.

The invention claimed is:

1. A system, comprising:
a reader circuit having a contactless reader function;
a first object including a transponder comprising an integrated circuit that has two terminals which may be selectively electrically short circuited to each other, the reader circuit and the transponder being configured to communicate with one another using a contactless communication protocol;
a second object, wherein the first and second objects are movable in relation to one another; and
a shorting circuit path that is located at least partly on said second object and configured to selectively electrically short circuit the two terminals to each other depending on a relative positioning of the first and second objects with respect to each other;
wherein the transponder is configured to transmit, to said reader circuit, positioning information corresponding to said relative positioning as indicated by whether the two terminals have been selectively electrically short circuited to each other by said shorting circuit path;
wherein the shorting circuit path includes a trigger circuit configured to selectively establish an electrical short circuit between the two terminals;
wherein:
the trigger circuit comprises, on the second object, two electrically conductive zones that are linked by an electrically conductive linking element; and
the two electrically conductive zones and the two terminals are arranged such that the two electrically conductive zones and the two terminals respectively become mutually electrically coupled in a first relative positioning of the first and second objects and such that the two electrically conductive zones and the two terminals do not respectively become mutually electrically coupled in at least one second relative positioning of the first and second objects that is different from the first relative positioning.

2. The system according to claim 1, wherein the integrated circuit comprises:
a register configured to contain said positioning information; and
a processing circuit configured to detect a potential electrical short circuit between the two terminals and to assign a first value to said positioning information when the two terminals have been selectively electrically short circuited to each other and assign a second value when the two terminals have not been selectively electrically short circuited to each other.

3. The system according to claim 1, wherein the two terminals being electrically short circuited to each other corresponds to a first relative positioning of the first and second objects, and the two terminals not being electrically short circuited to each other corresponds to at least one second relative positioning of the first and second objects that is different from the first relative positioning.

4. The system according to claim 1, wherein said trigger circuit is located on the second object.

5. The system according to claim 4, wherein the trigger circuit comprises electrically conductive circuitry.

6. The system according to claim 1, wherein the second object comprises said reader circuit.

7. The system according to claim 6, wherein the transponder includes a transponder antenna and the reader circuit includes a reader antenna, and wherein the transponder antenna, the two terminals and the reader antenna are arranged such that the reader antenna and the transponder antenna face one another when the two terminals are shorted.

8. The system according to claim 1, wherein said second object is distinct from said reader circuit.

9. The system according to claim 8, comprising a cellular mobile telephone incorporating said reader circuit.

10. The system according to claim 1, wherein the integrated circuit comprises:
a register configured to contain said positioning information; and
a processing circuit configured to detect a potential electrical short circuit between the two terminals and to assign a first value to said positioning information when the two terminals are electrically short circuited and assign a second value when the two terminals are not electrically short circuited; and
wherein the transponder includes at least one identifier of the first object, and the reader circuit is configured to perform an operation of authenticating the first object on the basis of said identifier and to deliver a first indication as to whether said identifier has been authenticated and whether said positioning information has the first value.

11. The system according to claim 1, wherein the shorting circuit path presents an impedance of less than 100 ohm between the two terminals.

12. The system according to claim 1, wherein the shorting circuit path presents an impedance of less than 50 ohm between the two terminals.

13. A system, comprising:
a reader circuit having a contactless reader function;
a first object including a transponder comprising an integrated circuit that has two terminals which may be selectively electrically short circuited to each other, the reader circuit and the transponder being configured to communicate with one another using a contactless communication protocol;
a second object, wherein the first and second objects are movable in relation to one another; and
a shorting circuit path that is located at least partly on said second object and configured to selectively electrically short circuit the two terminals to each other depending on a relative positioning of the first and second objects with respect to each other;
wherein the transponder is configured to transmit, to said reader circuit, positioning information corresponding to said relative positioning as indicated by whether the two terminals have been selectively electrically short circuited to each other by said shorting circuit path;
wherein the shorting circuit path includes a trigger circuit configured to selectively establish an electrical short circuit between the two terminals;
wherein:
the trigger circuit comprises an electrically conductive wall of the second object; and
the two terminals and said electrically conductive wall are arranged such that said electrically conductive wall and the two terminals are mutually electrically coupled in a first relative positioning of the first and second objects and such that said electrically conductive wall and the two terminals are not mutually electrically coupled in at least one second relative positioning of the first and second objects that is different from the first relative positioning.

14. The system according to claim 13, wherein the integrated circuit comprises:
a register configured to contain said positioning information; and
a processing circuit configured to detect a potential electrical short circuit between the two terminals and to assign a first value to said positioning information when the two terminals have been selectively electrically short circuited to each other and assign a second value when the two terminals have not been selectively electrically short circuited to each other.

15. The system according to claim 13, wherein the two terminals being electrically short circuited to each other corresponds to a first relative positioning of the first and second objects, and the two terminals not being electrically short circuited to each other corresponds to at least one second relative positioning of the first and second objects that is different from the first relative positioning.

16. The system according to claim 13, wherein said trigger circuit is located on the second object.

17. The system according to claim 13, wherein the second object comprises said reader circuit.

18. The system according to claim 17, wherein the transponder includes a transponder antenna and the reader circuit includes a reader antenna, and wherein the transponder antenna, the two terminals and the reader antenna are arranged such that the reader antenna and the transponder antenna face one another when the two terminals are shorted.

19. The system according to claim 13, wherein said second object is distinct from said reader circuit.

20. The system according to claim 19, comprising a cellular mobile telephone incorporating said reader circuit.

21. The system according to claim 13, wherein the integrated circuit comprises:
a register configured to contain said positioning information; and
a processing circuit configured to detect a potential electrical short circuit between the two terminals and to assign a first value to said positioning information when the two terminals are electrically short circuited and assign a second value when the two terminals are not electrically short circuited; and
wherein the transponder includes at least one identifier of the first object, and the reader circuit is configured to perform an operation of authenticating the first object on the basis of said identifier and to deliver a first indication as to whether said identifier has been authenticated and whether said positioning information has the first value.

22. The system according to claim 13, wherein the shorting circuit path presents an impedance of less than 100 ohm between the two terminals.

23. The system according to claim 13, wherein the shorting circuit path presents an impedance of less than 50 ohm between the two terminals.

24. A system, comprising:
a reader circuit having a contactless reader function;
a first object including a transponder comprising an integrated circuit that has two terminals which may be selectively electrically short circuited to each other, the reader circuit and the transponder being configured to communicate with one another using a contactless communication protocol;
a second object, wherein the first and second objects are movable in relation to one another; and
a shorting circuit path that is located at least partly on said second object and configured to selectively electrically short circuit the two terminals to each other depending on a relative positioning of the first and second objects with respect to each other;
wherein the transponder is configured to transmit, to said reader circuit, positioning information corresponding to said relative positioning as indicated by whether the two terminals have been selectively electrically short circuited to each other by said shorting circuit path;
wherein the shorting circuitry includes a trigger circuit configured to selectively establish an electrical short circuit between the two terminals and said first object comprises a first portion of the trigger circuit and the second object comprises a second portion of the trigger circuit;
wherein the trigger circuit comprises electromagnetic circuitry;
wherein:
the second portion of the trigger circuit comprises a magnetic element that is configured to generate a magnetic field; and
the first portion of the trigger circuit comprises a switch that is connected between the two terminals; and
wherein the magnetic element and the switch are mutually arranged such that, in a first relative positioning of the first and second objects, the switch is closed in the presence of said magnetic field, and such that the switch is open in at least one second relative positioning of the first and second objects that is different from the first relative positioning.

25. The system according to claim 24, wherein the integrated circuit comprises:
a register configured to contain said positioning information; and
a processing circuit configured to detect a potential electrical short circuit between the two terminals and to assign a first value to said positioning information when the two terminals have been selectively electrically short circuited to each other and assign a second value when the two terminals have not been selectively electrically short circuited to each other.

26. The system according to claim 24, wherein the two terminals being electrically short circuited to each other corresponds to a first relative positioning of the first and second objects, and the two terminals not being electrically short circuited to each other corresponds to at least one second relative positioning of the first and second objects that is different from the first relative positioning.

27. The system according to claim 24, wherein said trigger circuit is located on the second object.

28. The system according to claim 24, wherein the second object comprises said reader circuit.

29. The system according to claim 28, wherein the transponder includes a transponder antenna and the reader circuit includes a reader antenna, and wherein the transponder antenna, the two terminals and the reader antenna are arranged such that the reader antenna and the transponder antenna face one another when the two terminals are shorted.

30. The system according to claim 24, wherein said second object is distinct from said reader circuit.

31. The system according to claim 30, comprising a cellular mobile telephone incorporating said reader circuit.

32. The system according to claim 24, wherein the integrated circuit comprises:
a register configured to contain said positioning information; and
a processing circuit configured to detect a potential electrical short circuit between the two terminals and to assign a first value to said positioning information when the two terminals are electrically short circuited and assign a second value when the two terminals are not electrically short circuited; and
wherein the transponder includes at least one identifier of the first object, and the reader circuit is configured to perform an operation of authenticating the first object on the basis of said identifier and to deliver a first indication as to whether said identifier has been authenticated and whether said positioning information has the first value.

33. The system according to claim 24, wherein the shorting circuit path presents an impedance of less than 100 ohm between the two terminals.

34. The system according to claim 24, wherein the shorting circuit path presents an impedance of less than 50 ohm between the two terminals.

35. A system, comprising:
a reader circuit having a contactless reader function;
a first object including a transponder comprising an integrated circuit that has two terminals which may be selectively electrically short circuited to each other, the reader circuit and the transponder being configured to communicate with one another using a contactless communication protocol;
a second object, wherein the first and second objects are movable in relation to one another; and
a shorting circuit path that is located at least partly on said second object and configured to selectively electrically short circuit the two terminals to each other depending on a relative positioning of the first and second objects with respect to each other;
wherein the transponder is configured to transmit, to said reader circuit, positioning information corresponding to said relative positioning as indicated by whether the two terminals have been selectively electrically short circuited to each other by said shorting circuit path;
wherein the shorting circuitry includes a trigger circuit configured to selectively establish an electrical short circuit between the two terminals and said first object comprises a first portion of the trigger circuit and the second object comprises a second portion of the trigger circuit;
wherein the trigger circuit comprises electro-optical circuitry;
wherein:
the second portion of the trigger circuit comprises two interfaces that are linked by a light-guide; and the first portion of the trigger circuit comprises a light generator and a receiver block including a photo-element which is connected to the two terminals and configured to form an electrical short circuit of the two terminals when the photo-element receives light; and wherein the interfaces, the light generator and the photo-element are arranged such that, in a first relative positioning of the first and second objects, one of the interfaces faces the light generator and the other interface faces the photo-element, and such that, in at least one second relative positioning of the first and second objects that is different from the first relative positioning, the two interfaces do not face the light generator and the photo-element, respectively.

36. The system according to claim 35, wherein the integrated circuit comprises:
a register configured to contain said positioning information; and
a processing circuit configured to detect a potential electrical short circuit between the two terminals and to assign a first value to said positioning information when the two terminals have been selectively electrically short circuited to each other and assign a second value when the two terminals have not been selectively electrically short circuited to each other.

37. The system according to claim 35, wherein the two terminals being electrically short circuited to each other corresponds to a first relative positioning of the first and second objects, and the two terminals not being electrically short circuited to each other corresponds to at least one second relative positioning of the first and second objects that is different from the first relative positioning.

38. The system according to claim 35, wherein said trigger circuit is located on the second object.

39. The system according to claim 35, wherein the second object comprises said reader circuit.

40. The system according to claim 39, wherein the transponder includes a transponder antenna and the reader circuit includes a reader antenna, and wherein the transponder antenna, the two terminals and the reader antenna are arranged such that the reader antenna and the transponder antenna face one another when the two terminals are shorted.

41. The system according to claim 35, wherein said second object is distinct from said reader circuit.

42. The system according to claim 41, comprising a cellular mobile telephone incorporating said reader circuit.

43. The system according to claim 35, wherein the integrated circuit comprises:
a register configured to contain said positioning information; and
a processing circuit configured to detect a potential electrical short circuit between the two terminals and to assign a first value to said positioning information when the two terminals are electrically short circuited and assign a second value when the two terminals are not electrically short circuited; and
wherein the transponder includes at least one identifier of the first object, and the reader circuit is configured to perform an operation of authenticating the first object on the basis of said identifier and to deliver a first indication as to whether said identifier has been authenticated and whether said positioning information has the first value.

44. The system according to claim 35, wherein the shorting circuit path presents an impedance of less than 100 ohm between the two terminals.

45. The system according to claim 35, wherein the shorting circuit path presents an impedance of less than 50 ohm between the two terminals.

* * * * *